(12) United States Patent
Dutta

(10) Patent No.: US 10,138,743 B2
(45) Date of Patent: Nov. 27, 2018

(54) IMPINGEMENT COOLING SYSTEM FOR A GAS TURBINE ENGINE

(71) Applicant: General Electric Company, Schenectady, NY (US)

(72) Inventor: Sandip Dutta, Greenville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 405 days.

(21) Appl. No.: 15/176,208

(22) Filed: Jun. 8, 2016

(65) Prior Publication Data

US 2017/0356341 A1 Dec. 14, 2017

(51) Int. Cl.
| | |
|---|---|
| *F02C 7/18* | (2006.01) |
| *F01D 9/02* | (2006.01) |
| *F01D 9/06* | (2006.01) |
| *F01D 25/12* | (2006.01) |
| *F02C 3/04* | (2006.01) |
| *F01D 5/18* | (2006.01) |

(52) U.S. Cl.
CPC .............. *F01D 9/065* (2013.01); *F01D 5/189* (2013.01); *F01D 25/12* (2013.01); *F02C 3/04* (2013.01); *F02C 7/18* (2013.01); *F05D 2240/126* (2013.01); *F05D 2250/141* (2013.01); *F05D 2250/231* (2013.01); *F05D 2260/201* (2013.01); *F05D 2260/22141* (2013.01)

(58) Field of Classification Search
CPC .... F02C 7/18; F02C 3/04; F01D 25/12; F01D 9/065; F01D 5/189
See application file for complete search history.

(56) References Cited

U.S. PATENT DOCUMENTS

| | | | | |
|---|---|---|---|---|
| 4,645,415 A | * | 2/1987 | Hovan et al. | ......... F01D 25/125 |
| | | | | 415/115 |
| 6,899,518 B2 | | 5/2005 | Lucas et al. | |
| 8,943,827 B2 | * | 2/2015 | Prociw et al. | ........... F01D 25/12 |
| | | | | 60/730 |
| 2005/0150632 A1 | * | 7/2005 | Mayer et al. | ........... F01D 25/08 |
| | | | | 165/47 |
| 2005/0265835 A1 | | 12/2005 | Liang | |
| 2011/0103971 A1 | | 5/2011 | Hada et al. | |
| 2017/0350258 A1 | * | 12/2017 | Gaulden et al. | ........ F01D 5/187 |

* cited by examiner

*Primary Examiner* — Kevin Lee
(74) *Attorney, Agent, or Firm* — Dority & Manning, PA

(57) ABSTRACT

The present disclosure is directed to an impingement cooling system for a gas turbine engine having a gas turbine engine component and an insert positioned within the gas turbine engine component. The insert includes an insert body that defines an inner cavity therein, a first impingement aperture, a first heat exchanger inlet aperture, and a first heat exchanger outlet aperture. A first baffle extends outwardly from an outer surface of the insert body. The first baffle, the gas turbine engine component, and the insert body define a first and a second cooling chamber therebetween. The first impingement aperture fluidly couples the inner cavity of the insert body and the first cooling chamber. A first heat exchanger wall couples to an inner surface of the insert body. The first heat exchanger wall and the insert body define a first heat exchanger chamber therebetween.

20 Claims, 7 Drawing Sheets

US 10,138,743 B2

IMPINGEMENT COOLING SYSTEM FOR A GAS TURBINE ENGINE

FIELD OF THE TECHNOLOGY

The present disclosure generally relates to a gas turbine engine. More particularly, the present disclosure relates to an impingement cooling system for a gas turbine engine.

BACKGROUND

A gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in one or more combustion chambers to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The turbine section includes one or more turbine nozzles, which direct the flow of combustion gases onto one or more turbine rotor blades. The one or more turbine rotor blades, in turn, extract kinetic energy and/or thermal energy from the combustion gases, thereby driving the rotor shaft. In general, each turbine nozzle includes an inner side wall, and outer side wall, and one or more airfoils extending between the inner and outer side walls. Since the one or more airfoils are in direct contact with the combustion gases, it may be necessary to cool the airfoils.

In certain configurations, cooling air is routed through one or more inner cavities defined by the airfoils. Typically, the cooling air is compressed air bled from compressor section. Bleeding air from the compressor section, however, reduces the volume of compressed air available for combustion, thereby reducing the efficiency of the gas turbine engine.

BRIEF DESCRIPTION OF THE TECHNOLOGY

Aspects and advantages of the technology will be set forth in part in the following description, or may be obvious from the description, or may be learned through practice of the technology.

In one aspect, the present disclosure is directed to an impingement cooling system for a gas turbine engine. The impingement cooling system includes a gas turbine engine component and an insert positioned within the gas turbine engine component. The insert includes an insert body having an inner surface and an outer surface. The insert body defines an inner cavity therein, a first impingement aperture, a first heat exchanger inlet aperture, and a first heat exchanger outlet aperture. A first baffle extends outwardly from the outer surface of the insert body. The first baffle, the gas turbine engine component, and the insert body collectively define a first cooling chamber and a second cooling chamber therebetween. The first impingement aperture fluidly couples the inner cavity of the insert body and the first cooling chamber. A first heat exchanger wall couples to the inner surface of the insert body. The first heat exchanger wall and the insert body collectively define a first heat exchanger chamber therebetween. The first heat exchanger inlet aperture fluidly couples the first cooling chamber and the first heat exchanger chamber. The first heat exchanger outlet aperture fluidly couples the first heat exchanger chamber and the second cooling chamber.

A further aspect of the present disclosure is directed to a gas turbine engine having a compressor section, a combustion section, a turbine section, and a gas turbine component. An insert is positioned within the gas turbine engine component. The insert includes an insert body having an inner surface and an outer surface. The insert body defines an inner cavity therein, a first impingement aperture, a first heat exchanger inlet aperture, and a first heat exchanger outlet aperture. A first baffle extends outwardly from the outer surface of the insert body. The first baffle, the gas turbine engine component, and the insert body collectively define a first cooling chamber and a second cooling chamber therebetween. The first impingement aperture fluidly couples the inner cavity of the insert body and the first cooling chamber. A first heat exchanger wall couples to the inner surface of the insert body. The first heat exchanger wall and the insert body collectively define a first heat exchanger chamber therebetween. The first heat exchanger inlet aperture fluidly couples the first cooling chamber and the first heat exchanger chamber. The first heat exchanger outlet aperture fluidly couples the first heat exchanger chamber and the second cooling chamber.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended FIGS., in which.

Figure 1:
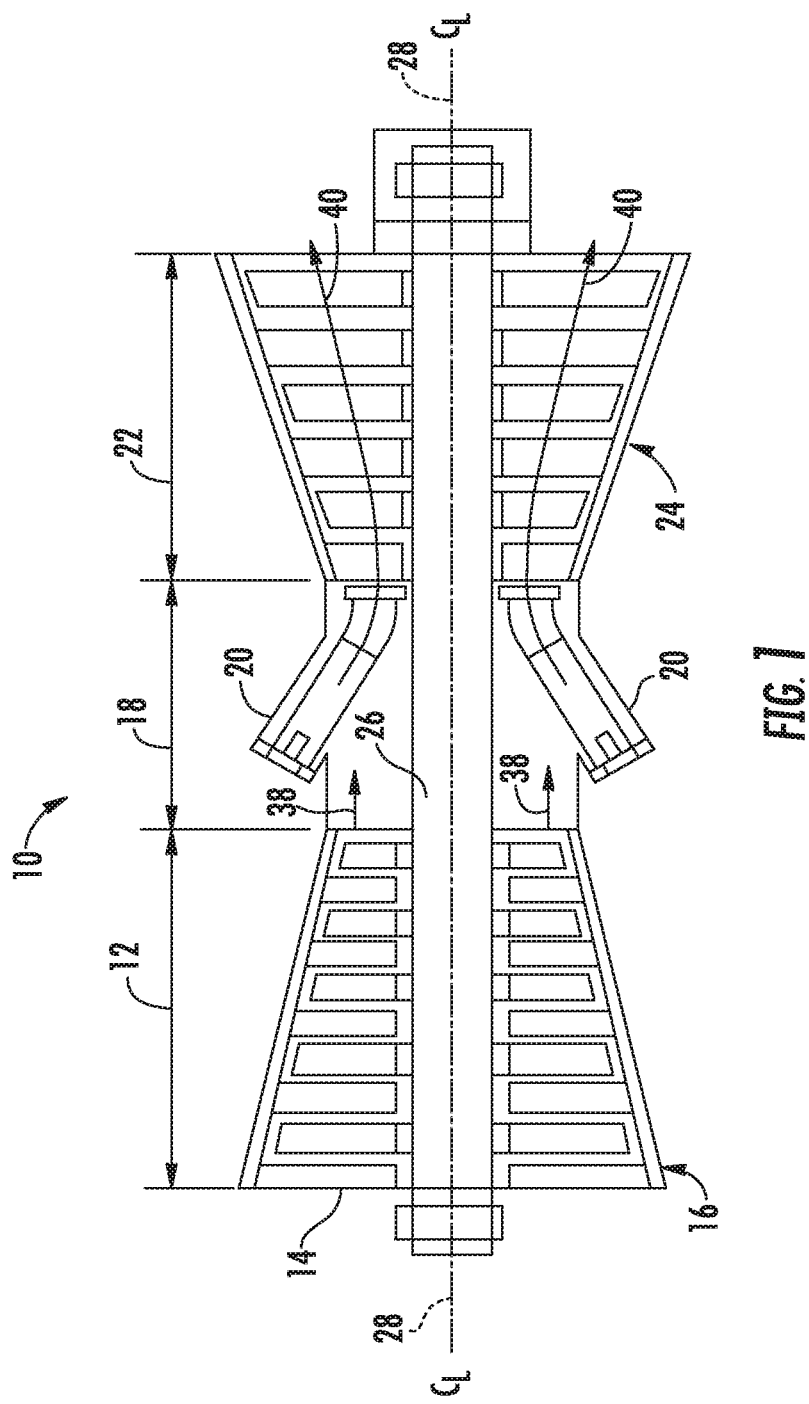
FIG. 1 is a schematic view of an exemplary gas turbine engine that may incorporate various embodiments disclosed herein.

Repeat use of reference characters in the present specification and drawings is intended to represent the same or analogous features or elements of the present technology.

DETAILED DESCRIPTION OF THE TECHNOLOGY

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents. Although an industrial or land-based gas turbine is shown and described herein, the present technology as shown and described herein is not limited to a land-based and/or industrial gas turbine unless otherwise specified in the claims. For example, the technology as described herein may be used in any type of turbine including, but not limited to, aviation gas turbines (e.g., turbofans, etc.), steam turbines, and marine gas turbines.

Referring now to the drawings, FIG. 1 is a schematic view of an exemplary gas turbine engine 10 that may incorporate various embodiments disclosed herein. As shown, the gas turbine engine 10 generally includes a compressor section 12 having an inlet 14 disposed at an upstream end of a compressor 16 (e.g., an axial compressor). The gas turbine engine 10 also includes a combustion section 18 having one or more combustors 20 positioned downstream from the compressor 16. The gas turbine engine 10 further includes a turbine section 22 having a turbine 24 (e.g., an expansion turbine) disposed downstream from the combustion section 18. A rotor shaft 26 extends axially through the compressor 16 and the turbine 24 along an axial centerline 28 of the gas turbine engine 10.

Figure 2:
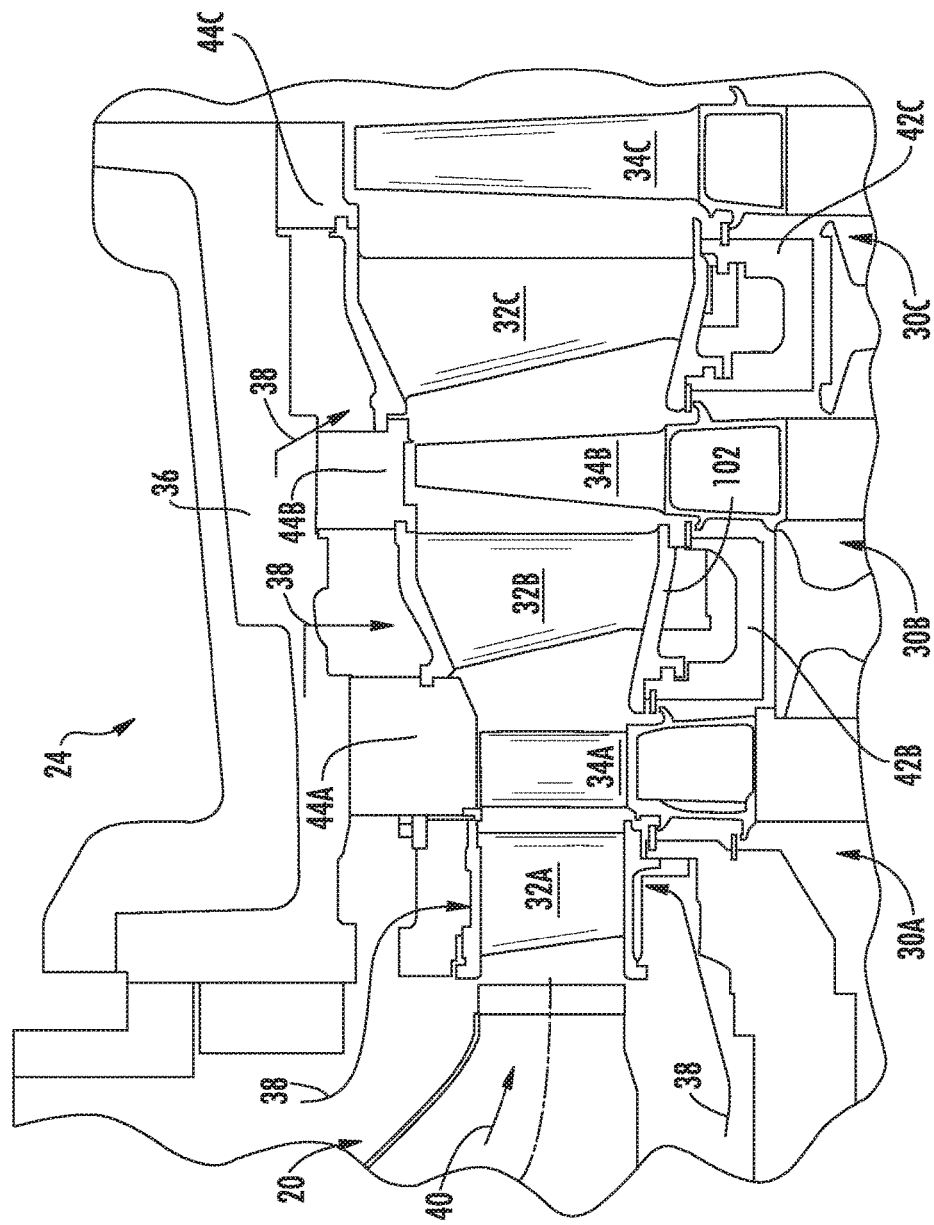
FIG. 2 is a cross-sectional view of an exemplary turbine section that may be incorporated in the gas turbine engine shown in FIG. 1 and may incorporate various embodiments disclosed herein.

FIG. 2 is a cross-sectional side view of the turbine 24 that may incorporate various embodiments disclosed herein. As shown in FIG. 2, the turbine 24 may include multiple turbine stages. For example, the turbine 24 may include a first stage 30A, a second stage 30B, and a third stage 30C. Although, the turbine 24 may include more or less turbine stages as is necessary or desired.

Each stage 30A-30C includes, in serial flow order, a corresponding row of turbine nozzles 32A, 32B, and 32C and a corresponding row of turbine rotor blades 34A, 34B, and 34C axially spaced apart along the rotor shaft 26 (FIG. 1). Each of the turbine nozzles 32A-32C remains stationary relative to the turbine rotor blades 34A-34C during operation of the gas turbine 10. Each of the rows of turbine nozzles 32B, 32C is respectively coupled to a corresponding diaphragm 42B, 42C. Although not shown in FIG. 2, the row of turbine nozzles 32A may also couple to a diaphragm. A first turbine shroud 44A, a second turbine shroud 44B, and a third turbine shroud 44C circumferentially enclose the corresponding row of turbine blades 34A-34C. A casing or shell 36 circumferentially surrounds each stage 30A-30C of the turbine nozzles 32A-32C and the turbine rotor blades 34A-34C.

As illustrated in FIGS. 1 and 2, the compressor 16 provides compressed air 38 to the combustors 20. The compressed air 38 mixes with fuel (e.g., natural gas) in the combustors 20 and burns to create combustion gases 40, which flow into the turbine 24. The turbine nozzles 32A-32C and turbine rotor blades 34A-34C extract kinetic and/or thermal energy from the combustion gases 40. This energy extraction drives the rotor shaft 26. The combustion gases 40 then exit the turbine 24 and the gas turbine engine 10. As will be discussed in greater detail below, a portion of the compressed air 38 may be used as a cooling medium for cooling the various components of the turbine 24 including, inter alia, the turbine nozzles 32A-32C.

Figure 3:
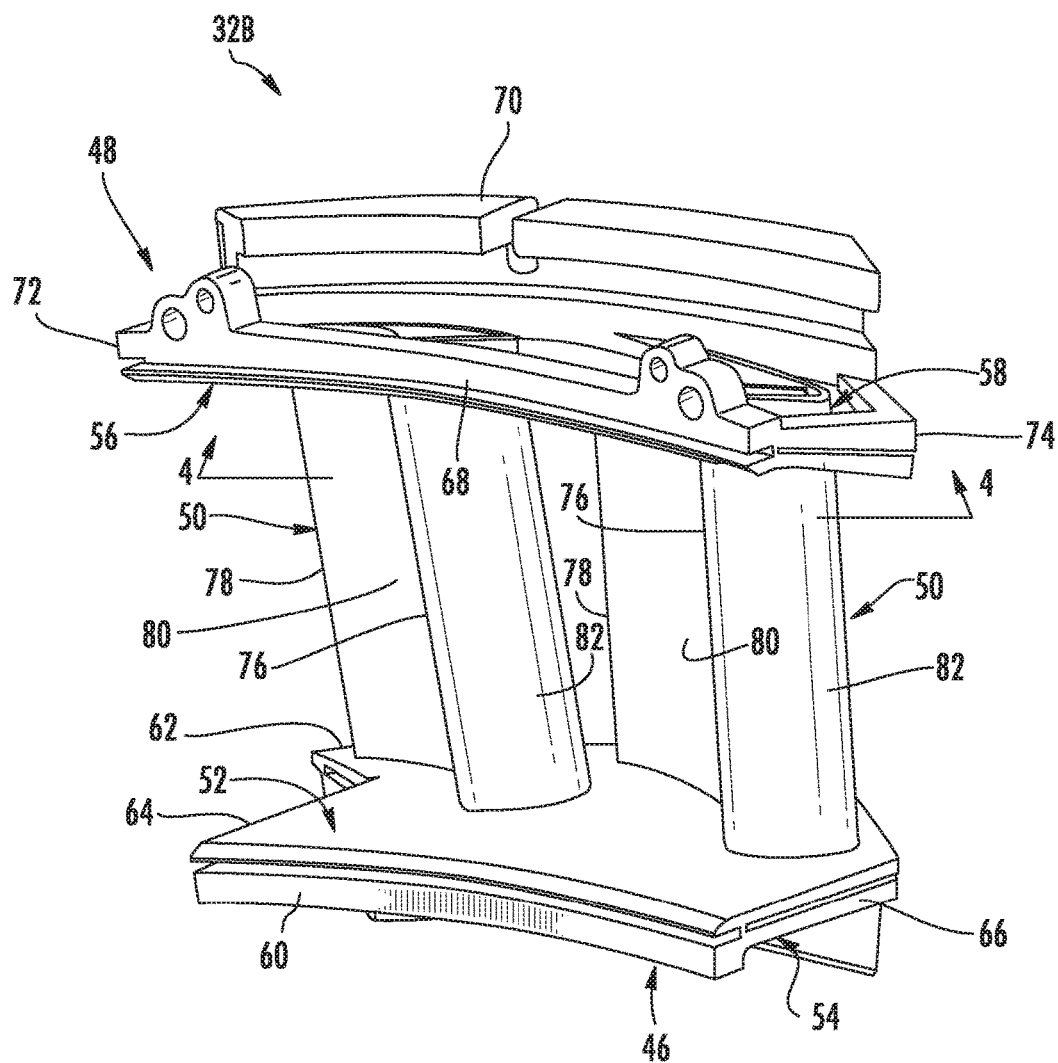
FIG. 3 is a perspective view of an exemplary nozzle that may be incorporated into the turbine section shown in FIG. 2 and may incorporate various embodiments disclosed herein.

FIG. 3 is a perspective view of the turbine nozzle 32B of the second stage 30B, which may also be known in the industry as the stage two nozzle or S2N. The other turbine nozzles 32A, 32C include features similar to those of the turbine nozzle 32B, which will be discussed in greater detail below. As shown in FIG. 3, the turbine nozzle 32B includes an inner side wall 46 and an outer side wall 48 radially spaced apart from the inner side wall 46. A pair of airfoils 50 extends in span from the inner side wall 46 to the outer side wall 48. In this respect, the turbine nozzle 32B illustrated in FIG. 3 is referred to in the industry as a doublet. Nevertheless, the turbine nozzle 32B may have only one airfoil 50 (i.e., a singlet), three airfoils 50 (i.e., a triplet), or more airfoils 50.

As illustrated in FIG. 3, the inner and the outer side walls 46, 48 include various surfaces. More specifically, the inner side wall 46 includes a radially outer surface 52 and a radially inner surface 54 positioned radially inwardly from the radially outer surface 52. Similarly, the outer side wall 48 includes a radially inner surface 56 and a radially outer surface 58 oriented radially outwardly from the radially inner surface 56. As shown in FIGS. 2 and 3, the radially inner surface 56 of the outer side wall 48 and the radially outer surface 52 of the inner side wall 46 respectively define inner and outer radial flow boundaries for the combustion gases 40 flowing through the turbine 24. The inner side wall 46 also includes a forward surface 60 and an aft surface 62 positioned downstream from the forward surface 60. The inner side wall 46 further includes a first circumferential surface 64 and a second circumferential surface 66 circumferentially spaced apart from the first circumferential surface 64. Similarly, the outer side wall 48 includes a forward surface 68 and an aft surface 70 positioned downstream from the forward surface 68. The outer side wall 48 also includes a first circumferential surface 72 and a second circumferential surface 74 spaced apart from the first circumferential surface 72. The inner and the outer side walls 46, 48 are preferably constructed from a nickel-based superalloy or another suitable material capable of withstanding the combustion gases 40.

Figure 4:
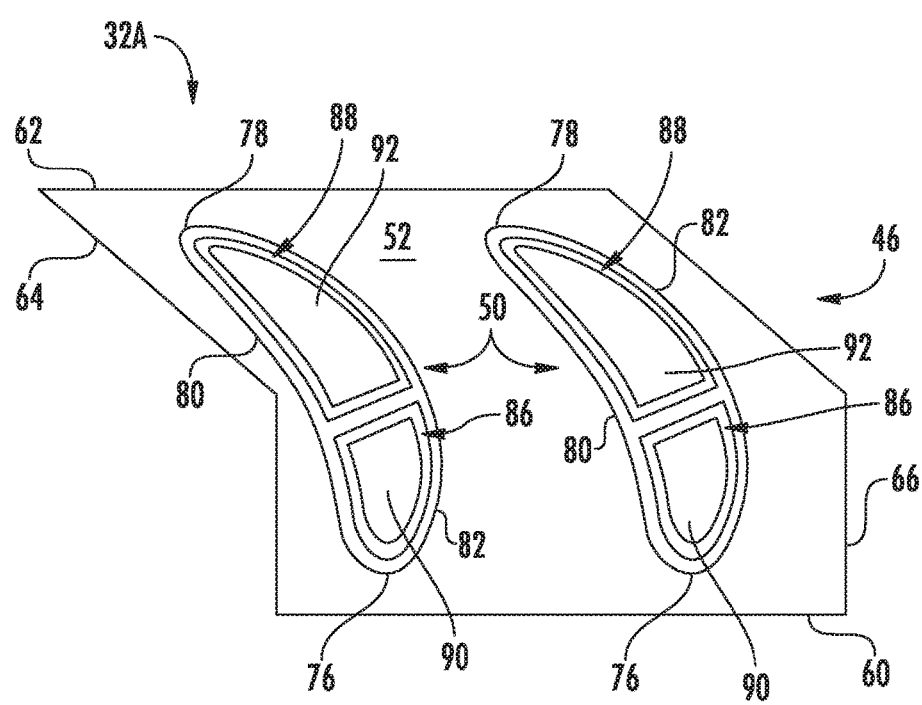
FIG. 4 is a cross-sectional view of the exemplary nozzle taken generally about line 4-4 in FIG. 3, further illustrating the features thereof.

As mentioned above, two airfoils 50 extend from the inner side wall 46 to the outer side wall 48. As illustrated in FIGS. 3 and 4, each airfoil 50 includes a leading edge 76 disposed proximate to the forward surfaces 60, 68 of the inner and outer side walls 46, 48. Each airfoil 50 also includes a trailing edge 78 disposed proximate to the aft surfaces 62, 70 of the inner and outer side walls 46, 48. Furthermore, each airfoil 50 includes a pressure side wall 80 and an opposing suction side wall 82 extending from the leading edge 76 to the trailing edge 78. The airfoils 50 are preferably constructed from a nickel-based superalloy or another suitable material capable of withstanding the combustion gases 40.

Each airfoil 50 may define one or more inner cavities therein. An insert may be positioned in each of the inner cavities to provide the compressed air 38 (e.g., via impingement cooling) to the pressure-side and suction-side walls 80, 82 of the airfoil 50. In the embodiment illustrated in FIG. 4, each airfoil 50 defines a forward inner cavity 86 having forward insert 90 positioned therein and an aft inner cavity 88 having an aft insert 92 positioned therein. A rib 94 (FIG. 5) may separate the forward and aft inner cavities 86, 88. Nevertheless, the airfoils 50 may define one inner cavity, three inner cavities, or four or more inner cavities in alternate embodiments. Furthermore, some or all of the inner cavities may not include inserts in certain embodiments as well.

Figure 5:
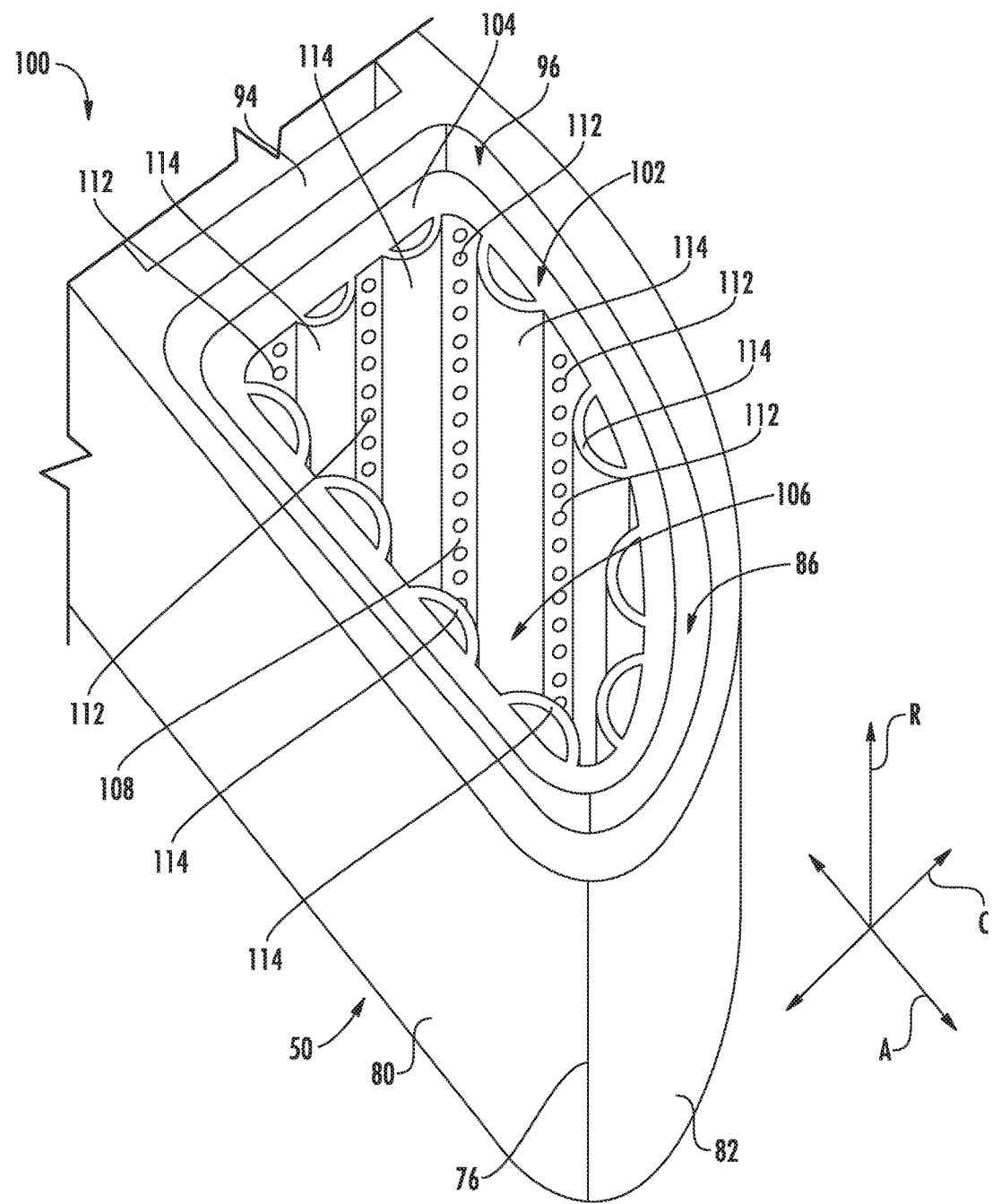
FIG. 5 is a perspective view of an insert that may be incorporated into the nozzle shown in FIGS. 3 and 4 in accordance with the embodiments disclosed herein.
Figure 6:
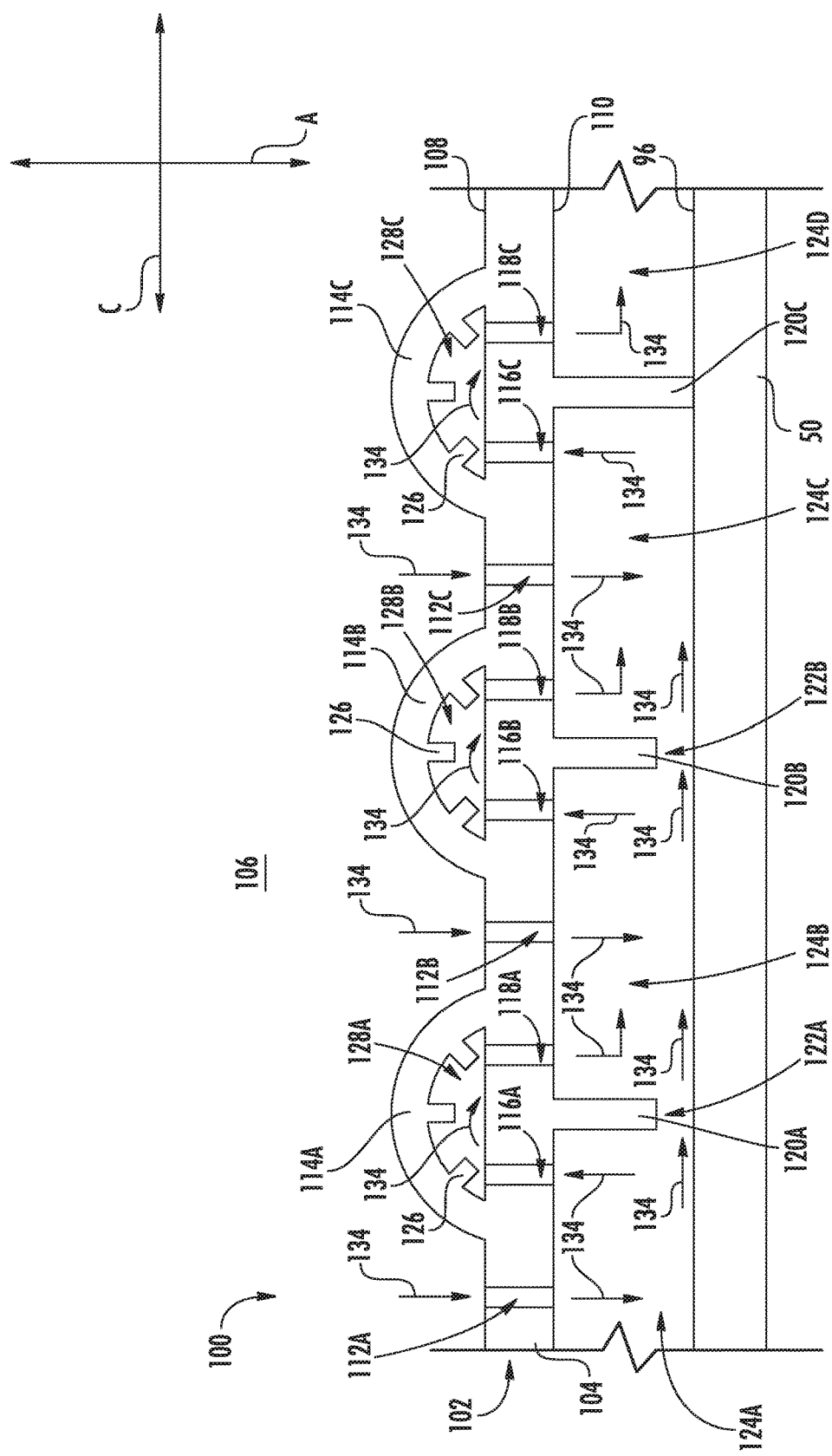
FIG. 6 is a cross-sectional view of a portion of the insert shown in FIG. 5, illustrating an impingement cooling system.
Figure 7:
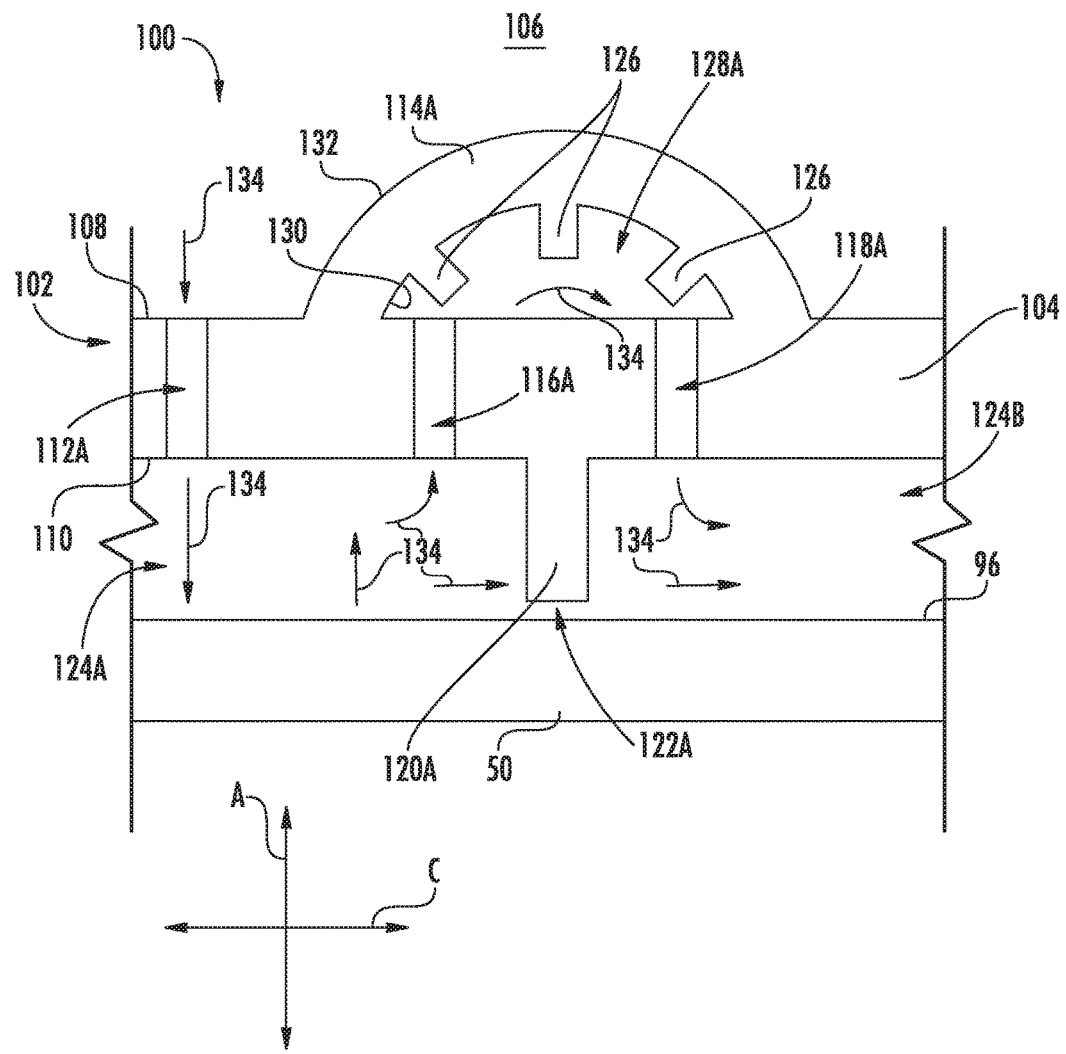
FIG. 7 is an enlarged cross-sectional view of a portion of the insert, further illustrating the impingement cooling system.

FIGS. 5-7 illustrate an embodiment of an impingement cooling system 100, which may be incorporated into the gas turbine engine 10. As depicted therein, the impingement cooling system 100 defines an axial direction A, a radial direction R, and a circumferential direction C. In general, the axial direction A extends parallel to the axial centerline 28 (FIG. 1), the radial direction R extends orthogonally outward from the axial centerline 28, and the circumferential direction C extends concentrically around the axial centerline 28.

As best illustrated in FIG. 5, the impingement cooling system 100 includes an insert 102. In particular, the insert 102 may be positioned in the forward inner cavity 86 of one of the airfoils 50 in the nozzle 32B in place of the forward insert 90 as shown in FIG. 4.

Referring now to FIGS. 5-7, the insert 102 includes an insert body 104. More specifically, the insert body 104 is generally tubular and defines an inner cavity 106 therein. In this respect, the insert body 104 includes an inner surface 108, which forms the outer boundary of the inner cavity 106, and an outer surface 110 spaced apart from the inner surface 108. In the embodiment illustrated in FIG. 5, the insert body 104 generally has a D-shape. Although, the insert body 104 may have any suitable shape (e.g., annular) in other embodiments as well.

The insert body 104 is spaced apart from the pressure-side wall 80, the suction-side wall 82, and the rib 94 of the airfoil 50. As illustrated in FIG. 5, an inner surface 96 of the airfoil 50 (i.e., of the pressure-side wall 80, the suction-side wall 82, and the rib 94) forms the outer boundary of the forward inner cavity 86. The insert 102 is positioned within the forward inner cavity 86 in such a manner that the outer surface 110 of the insert body 104 is axially and/or circumferentially spaced apart from the inner surface 96 of the pressure-side wall 80, the suction-side wall 82, and the rib 94. The spacing between the outer surface 110 of the insert body 104 and the inner surface 96 of the airfoil 50 should be sized to facilitate impingement cooling of the inner surface 96 as will be discussed in greater detail below.

In the embodiment shown in FIG. 5, the insert body 104 defines a plurality of impingement apertures 112 extending therethrough. Each of the plurality of impingement apertures 112 is positioned in one of a plurality of radially extending rows. Each adjacent pair of the plurality of rows of impingement apertures 112 are spaced apart by a heat exchanger wall 114. The impingement apertures 112 are spaced apart within the rows in a manner that provides sufficient impingement cooling to the airfoil 50 as will be discussed in greater detail below. Preferably, the rows of impingement apertures 112 extend along substantially the entire radial length of the insert body 104. Although, the rows of impingement apertures 112 may extend along only a portion of the radial length of the insert body 104 as well. Nevertheless, the plurality of impingement apertures 112 may be arranged in any suitable manner on the insert body 104. Furthermore, the insert body 104 may define any number of impingement apertures 112 so long as the insert body 104 defines at least one impingement aperture 112.

FIG. 6 illustrates a portion of the insert body 104 shown in FIG. 5. In particular, the portion of the insert 102 shown in FIG. 6 includes a first impingement aperture 112A, a second impingement aperture 112B, and a third impingement aperture 112C. The first, the second, and the third impingement apertures 112A-112C are radially aligned with one another. The first and the second impingement apertures 112A, 112B are circumferentially spaced apart by a first heat exchanger wall 114A. Similarly, the second and the third impingement apertures 112B, 112C are circumferentially spaced apart by a second heat exchanger wall 114B. Each of the first, the second, and the third impingement apertures 112A-112C extend from the inner surface 108 of the insert body 104 to the outer surface 110 of the insert body 104. The first, the second, and the third impingement apertures 112A-112C preferably have a circular cross-section, but may have any suitable cross-sectional shape.

The insert body 104 also defines one or more heat exchanger inlet apertures extending therethough. The heat exchanger inlet apertures are not shown in FIG. 5 because the heat exchanger walls 114 hide the heat exchanger inlet apertures in the view shown therein. Nevertheless, the embodiment of the insert body 104 shown in FIG. 5 defines as many heat exchanger inlet apertures as the insert body 104 defines impingement apertures 112. In this respect, each heat exchanger inlet aperture corresponds to one of the impingement apertures 112. The heat exchanger inlet apertures are generally arranged in a similar manner as the impingement apertures 112. That is, the heat exchanger inlet apertures are arranged in radially-extending rows that may extend for a portion of or the entirety of the radial length of the insert body 104. Nevertheless, the heat exchanger inlet apertures may be arranged in any suitable manner on the insert body 104. Furthermore, the insert body 104 may define any number of heat exchanger inlet apertures so long as the insert body 104 defines at least one heat exchanger inlet aperture.

The portion of the insert body 104 shown in FIG. 6 includes a first heat exchanger inlet aperture 116A, a second heat exchanger inlet aperture 116B, and a third heat exchanger inlet aperture 116C. The first heat exchanger inlet aperture 116A is circumferentially positioned between the first and the second impingement apertures 112A, 112B. The second heat exchanger inlet aperture 116B is circumferentially positioned between the second and the third impingement apertures 112B, 112C. The third heat exchanger inlet aperture 116C is circumferentially positioned between the third impingement aperture 112C and a fourth impingement aperture (not shown). The first, the second, and the third heat exchanger inlet apertures 116A-116C are radially aligned with each other and radially aligned the first, the second, and the third impingement apertures 112A-112C in the embodiment shown in FIG. 6. Each of the first, the second, and the third heat exchanger inlet apertures 116A-116C extend from the inner surface 108 of the insert body 104 to the outer surface 110 of the insert body 104. The first, the second, and the third heat exchanger inlet apertures 116A-116C preferably have a circular cross-section, but may have any suitable cross-sectional shape.

The insert body 104 also defines one or more heat exchanger outlet apertures extending therethough. Like the heat exchanger inlet apertures, the heat exchanger outlet apertures are not shown in FIG. 5 because the heat exchanger walls 114 hide the heat exchanger outlet apertures in the view shown therein. Nevertheless, the embodiment of the insert body 104 shown in FIG. 5 defines as many heat exchanger outlet apertures as the insert body 104 defines impingement apertures 112 and heat exchanger inlet apertures. In this respect, each heat exchanger outlet aperture corresponds to one of the impingement apertures 112 and one of the heat exchanger inlet apertures. The heat exchanger outlet apertures are generally arranged in a similar manner as the impingement apertures 112 and the heat exchanger inlet apertures. That is, the heat exchanger outlet apertures are arranged in radially-extending rows that may extend for a portion of or the entirety of the radial length of the insert body 104. Nevertheless, the heat exchanger outlet apertures may be arranged in any suitable manner on the insert body 104. Furthermore, the insert body 104 may define any number of heat exchanger outlet apertures so long as the insert body 104 defines at least one heat exchanger outlet aperture.

The portion of the insert body 104 shown in FIG. 6 includes a first heat exchanger outlet aperture 118A, a second heat exchanger outlet aperture 118B, and a third heat exchanger outlet aperture 118C. The first heat exchanger outlet aperture 118A is circumferentially positioned between the first heat exchanger inlet aperture 116A and the second impingement aperture 112B. The second heat exchanger outlet aperture 118B is circumferentially positioned between the second heat exchanger inlet aperture 116B and the third impingement aperture 112C. The third heat exchanger outlet aperture 118C is circumferentially positioned between the third heat exchanger inlet aperture 116C and the fourth impingement aperture (not shown). The first, the second, and the third heat exchanger outlet apertures 118A-118C are radially aligned with each other, radially aligned with the first, the second, and the third impingement apertures 112A-112C, and radially aligned with the first, the second, and the third heat exchanger inlet apertures 116A-116C in the embodiment shown in FIG. 6. Each of the first, the second, and the third heat exchanger outlet apertures 118-118C extend from the inner surface 108 of the insert body 104 to the outer surface 110 of the insert body 104. The first, the second, and the third heat exchanger outlet apertures 118A-118C preferably have a circular cross-section, but may have any suitable cross-sectional shape.

The insert 102 includes one or more baffles extending outwardly from the insert body 104. The baffles are not shown in FIG. 5 because the heat exchanger walls 114 hide the baffles in the view shown therein. Nevertheless, the embodiment of the insert 102 shown in FIG. 5 includes as many baffles as the insert 102 includes heat exchanger walls 114 (i.e., ten baffles). The baffles preferably extend along the entire radial length of the insert body 104. Although, the baffles may extend for only a portion of the radial length of the insert body 104 as well. Nevertheless, the insert 102 may include any number of baffles so long as the insert 102 defines at least one baffle.

The portion of the insert body 104 shown in FIG. 6 includes a first baffle 120A, a second baffle 120B, and a third baffle 120C. As illustrated in FIG. 6, the first, the second, and the third baffles 120A-120C extend outwardly from the outer surface 110 of the insert body 104 toward the inner surface 96 of the airfoil 50. The first baffle 120A is circumferentially positioned between the first heat exchanger inlet aperture 116A and the first heat exchanger outlet aperture 118A. The second baffle 120B is circumferentially positioned between the second heat exchanger inlet aperture 116B and the second heat exchanger outlet aperture 118B. The third baffle 120C is circumferentially positioned between the third heat exchanger inlet aperture 116C and the third heat exchanger outlet aperture 118C. The first and the second baffles 120A, 120B are spaced apart from the inner surface 96 of the airfoil 50. In this respect, the first baffle 120A and the airfoil 50 define a first slot 122A therebetween. Similarly, the second baffle 120B and the airfoil 50 define a second slot 122B therebetween. The third baffle 120C abuts the inner surface 96 of the airfoil 50. Nevertheless, the first, the second, and the third baffles 120A-120B may all be spaced apart from the inner surface 96 of the airfoil 50, may all abut the inner surface 96 of the airfoil 50, or any combination thereof. The first, the second, and the third baffles 120A-120C preferably have a rectangular cross-section, but may have any suitable cross-sectional shape.

The insert 102 and the airfoil 50 define one or more cooling chambers therebetween. The cooling chambers are not shown in FIG. 5 because the insert 102 hides the cooling chambers in the view shown therein. Nevertheless, the insert 102 and the airfoil 50 define as many cooling chambers therebetween as the insert body 104 defines impingement apertures 112 in the embodiment shown in FIG. 5. Nevertheless, the insert 102 and the airfoil 50 may include any number of cooling chambers so long as the insert 102 and the airfoil 50 define at least one cooling chamber therebetween.

The portions of the airfoil 50 and the insert 102 shown in FIG. 6 define a first cooling chamber 124A, a second cooling chamber 124B, a third cooling chamber 124C, and a fourth cooling chamber 124D therebetween. More specifically, the airfoil 50, the insert body 104, the first baffle 120A, and a baffle (not shown) positioned to the left of the first impingement aperture 112A define the first cooling chamber 124A. The airfoil 50, the insert body 104, the first baffle 120A, and the second baffle 120B define the second cooling chamber 124B. The airfoil 50, the insert body 104, the second baffle 120B, and the third baffle 120C define the third cooling chamber 124C. The airfoil 50, the insert body 104, the third baffle 120C, and a fourth baffle (not shown) positioned to the right of the third heat exchanger outlet aperture 118C define the the fourth cooling chamber 124D.

The impingement cooling apertures 112 fluidly couple the inner cavity 106 of the insert body 104 and the cooling chambers. More specifically, the first impingement aperture 112A fluidly couples the inner cavity 106 and the first cooling chamber 124A. The second impingement aperture 112B fluidly couples the inner cavity 106 and the second cooling chamber 124B. The third impingement aperture 112C fluidly couples the inner cavity 106 and the third cooling chamber 124C.

The insert 102 includes one or more heat exchanger walls 114 extending outwardly from the insert body 104. The heat exchanger walls 114 are spaced apart from each other by the rows of impingement apertures 112 as shown in FIG. 5. In this respect, each of the heat exchanger walls 114 corresponds to one of the rows of impingement apertures 112. In the embodiment shown in FIG. 5, the insert 102 includes ten heat exchanger walls 114. Nevertheless, the insert 102 may include any number of heat exchanger walls 114 so long as the insert 102 includes at least one heat exchanger wall 114.

The portion of the insert 102 shown in FIG. 6 includes the first heat exchanger wall 114A, the second heat exchanger wall 114B, and a third heat exchanger wall 114C. As illustrated in FIG. 6, the first, the second, and the third heat exchanger walls 114A-114C extend outwardly from the inner surface 108 of insert body 104 into the inner cavity 106 defined by the insert 102. In the embodiment shown in FIG. 6, the first, the second, and the third heat exchanger walls 114A-114C have an arcuate cross-section. Nevertheless, the first, the second, and the third heat exchanger walls 114A-114C may have any suitable cross-sectional shape as well.

As mentioned above, the heat exchanger walls 114 are spaced apart by the impingement apertures 112. In particular, the first heat exchanger wall 114A is circumferentially positioned between the first impingement aperture 112A and the second impingement aperture 112B. The second heat exchanger wall 114B is circumferentially positioned between the second impingement aperture 112B and the third impingement aperture 112C. The third heat exchanger wall 114C is circumferentially positioned between the third impingement aperture 112C and the fourth impingement aperture (not shown).

Each of the first, the second, and the third heat exchanger walls 114A-114C couple to the inner surface 108 of the insert body 104 at two different positions thereon. The first heat exchanger wall 114A couples to the insert body 104 at a first position between the first impingement aperture 112A and the first heat exchanger inlet aperture 116A and at a second position between the first heat exchanger outlet aperture 118A and the second impingement aperture 112B. The second heat exchanger wall 114B couples to the insert body 104 at a first position between the second impingement aperture 112B and the second heat exchanger inlet aperture 116B and at a second position between the second heat exchanger outlet aperture 118B and the third impingement aperture 112C. The third heat exchanger wall 114C couples to the insert body 104 at a first position between the third impingement aperture 112C and the third heat exchanger inlet aperture 116C and at a second position between the third heat exchanger outlet aperture 118C and the fourth impingement aperture (not shown). In this respect, each of the first, the second, and the third heat exchanger inlet apertures 116A-116C are circumferentially aligned with a portion of the corresponding first, second, and third heat exchanger walls 114A-114C. Similarly, each of the first, the second, and the third heat exchanger outlet apertures 118A-118C are circumferentially aligned with a portion of the corresponding first, second, and third heat exchanger walls 114A-114C.

The insert body 104 and each of the heat exchanger walls 114 define a heat exchanger chamber therebetween. As illustrated in FIGS. 6 and 7, the insert body 104 and the first heat exchanger wall 114A define a first heat exchanger chamber 128A. The insert body 104 and the second heat exchanger wall 114B define a second heat exchanger chamber 128B. The insert body 104 and the third heat exchanger wall 114C define a third heat exchanger chamber 128C. In the embodiment shown in FIGS. 6 and 7, the first, the second, and the third heat exchanger chambers 128A-128C have a half-circle cross-sectional shape. Although, the first, the second, and the third heat exchanger chambers 128A-128C may have any suitable cross-sectional shape as well.

The heat exchanger inlet and outlet apertures fluidly couple the cooling chambers to the corresponding heat exchanger chamber. More specifically, the first heat exchanger inlet aperture 116A fluidly couples the first cooling chamber 124A and the first heat exchanger chamber 128A. The first heat exchanger outlet aperture 118A fluidly couples the second cooling chamber 124B and the first heat exchanger chamber 128A. The second heat exchanger inlet aperture 116B fluidly couples the second cooling chamber 124B and the second heat exchanger chamber 128B. The second heat exchanger outlet aperture 118B fluidly couples the third cooling chamber 124C and the second heat exchanger chamber 128B. The third heat exchanger inlet aperture 116C fluidly couples the third cooling chamber 124C and the third heat exchanger chamber 128C. The third heat exchanger outlet aperture 118C fluidly couples the fourth cooling chamber 124D and the third heat exchanger chamber 128C.

As illustrated in FIGS. 6 and 7, the first, the second, and the third heat exchanger walls 114A-114C may include one or more fins 126 extending into the corresponding heat exchanger chambers 128A-128C. Referring particularly to FIG. 7, the first heat exchanger wall 114A includes an outer surface 130 and an inner surface 132 spaced apart from the outer surface 130. The outer surface 130 forms a portion of the outer boundary of the first heat exchanger chamber 128A, and the inner surface 132 forms a portion of outer boundary of the inner cavity 106 of the insert 102. The one or more fins 126 extend outwardly from the outer surface 130 of the first heat exchanger wall 114A into the first heat exchanger chamber 128A. In the embodiment shown in FIGS. 6 and 7, three fins 126 extend outwardly from each of the first, the second, and the third heat exchanger walls 114A-114C. Nevertheless, the first, the second, and the third heat exchanger walls 114A-114C may include more or less fins 126 or no fins 126 at all. Furthermore, the fins 126 have a rectangular cross-sectional shape in the embodiment shown in FIGS. 6 and 7; although, the fins 126 may have any suitable shape (e.g., hemispherical, etc.) in other embodiments.

Preferably, the insert 102 is integrally formed. In this respect, the insert body 104, the baffles, the heat exchanger walls 114, and the fins 126 are all formed as a single component. Nevertheless, the insert 102 may be formed from two or more separate components as well.

The insert 102 is preferably formed via additive manufacturing. The term "additive manufacturing" as used herein refers to any process which results in a useful, three-dimensional object and includes a step of sequentially forming the shape of the object one layer at a time. Additive manufacturing processes include three-dimensional printing (3DP) processes, laser-net-shape manufacturing, direct metal laser sintering (DMLS), direct metal laser melting (DMLM), plasma transferred arc, freeform fabrication, etc. A particular type of additive manufacturing process uses an energy beam, for example, an electron beam or electromagnetic radiation such as a laser beam, to sinter or melt a powder material. Additive manufacturing processes typically employ metal powder materials or wire as a raw material. Nevertheless, the insert 102 may be constructed using any suitable manufacturing process.

In operation, the impingement cooling system 100 provides cooling air 134 to the airfoils 50 of the nozzle 32B. As illustrated in FIG. 2, a portion of the compressed air 38 bled from the compressor section 12 (FIG. 1) is directed into the nozzle 32B. In particular, this portion of the compressed air 38 flows through the inner cavity 106 of the insert body 104 positioned in the forward cavity 86 of the nozzle 32B. In this respect, the compressed air 38 flows radially inwardly through the airfoils 50 of the nozzle 32B (i.e., from the outer side wall 48 toward the inner side wall 46). As will be discussed in greater detail below, the impingement cooling system 100 directs at least a portion of the compressed air 38 flowing through the inner cavity 106 onto the inner surface 96 of the airfoil 50. The portion of the compressed air 38 directed onto the inner surface 96 will hereinafter be referred to as the cooling air 134.

As illustrated in FIGS. 6 and 7, the cooling air 134 cools the inner surface 96 of the airfoil 50 via impingement cooling. More specifically, the cooling air 134 flows from the inner cavity 106 of the insert body 104 into the first, the second, and the third impingement apertures 112A-112C, which direct the cooling air 134 onto the inner surface 96 of the airfoil 50. That is, the cooling air 134 flows from the first, the second, and the third impingement apertures 112A-112C through the corresponding first, second, and third cooling chambers 124A-124C until the cooling air 134 strikes the inner surface 96. As such, the first, the second, and the third impingement apertures 112A-112C provide impingement cooling to airfoil 50. In this respect, the first, the second, and the third cooling chambers 124A-124C should have an axial length that permits impingement cooling of the airfoil 50. Furthermore, the first, the second, and the third impingement apertures 112A-112C should be sized and arranged to provide impingement cooling of the airfoil 50 as well.

After impinging the inner surface 96 of the airfoil 50, a portion of the cooling air 134 flows through the first, the second, and the third heat exchanger chambers 128A-128C to reduce the temperature thereof. More specifically, the temperature of the cooling air 134 increases after impinging the inner surface 96. In this respect, a portion of the cooling air 134 in the first cooling chamber 124A flows through the first heat exchanger inlet aperture 116A and into the first exchanger chamber 128A. The cooling air 134 in the first heat exchanger chamber 128A is cooled by the compressed air 38 flowing through the inner cavity 106 of the insert 102. The fins 126, if included, further cool the cooling air 134 in the first heat exchanger chamber 128A. The cooling air 134 then exits the first heat exchanger chamber 128A through the first heat exchanger outlet aperture 118A and flows into the second cooling chamber 124B. In this respect, the cooling air 134 from the first heat exchanger chamber 128A mixes with the cooling air 134 that enters the second cooling chamber 124B through the second impingement aperture 112B. The second and the third heat exchanger 128B, 128C operate in a similar manner as the first heat exchanger chamber 128A.

As mentioned above, the first baffle 120A and the airfoil 50 may define a first slot 122A therebetween. As such, a portion of the cooling air 134 in the first cooling chamber 124A may flow into the second cooling chamber 124B after striking the inner surface 96 without flowing through the first heat exchanger chamber 128A. Nevertheless, the first baffle 120A may abut the inner surface 96 of the airfoil 50 other embodiments. In such embodiments, the all of the cooling air 134 in the first cooling chamber 124A flows through the first heat exchanger chamber 128A. The second and the third baffles 120B, 120C operate in a similar manner as the first baffle 120A.

As discussed in greater detail above, a portion of the cooling air 134 present in the first cooling chamber 124A flows through the first heat exchanger chamber 128A after impingement, thereby reducing the temperature of the cooling air 134. The cooling air 134 from the first heat exchanger chamber 128A then mixes with the cooling air 134 flowing through the second impingement aperture 112B into the second cooling chamber 124B. Since the first heat exchanger chamber 128A reduces the temperature of the cooling air 134 flowing therethrough, a smaller volume of the compressed air 38 need be diverted from the inner cavity 106 of the insert body 104 by the second impingement aperture 112B. That is, the impingement cooling system 100 cools (i.e., via the first heat exchanger chamber 128A) and reuses at least a portion of the cooling air 134 from the first cooling chamber 124A when cooling the portion of the inner surface 96 adjacent to the second cooling chamber 124B. The impingement cooling system 100 also reuses a portion of the cooling air 134 from the second cooling chamber 124B to partially cool the portion of the inner surface 96 adjacent to the third cooling chamber 124C. Similarly, a portion of the cooling air 134 from the third cooling chamber 124C is reused to partially cool the portion of the inner surface 96 adjacent to the fourth cooling chamber 124D. In this respect, the impingement cooling system 100 recycles cooling air 134 from each of the first, the second, and the third cooling chambers 124A-124C, thereby reducing the overall volume of the cooling air 134 needed to adequately cool the airfoil 50. As such, less compressed air 38 need be diverted from the compressor section 12 (FIG. 1), thereby increasing the efficiency of the gas turbine engine 10.

The impingement cooling system 100 was discussed above in the context of the forward insert 90 positioned in the forward cavity 86 of a second stage nozzle 32B. Nevertheless, the impingement cooling system 100 may be incorporated into any insert positioned in any cavity of any nozzle in the gas turbine engine 10. In some embodiments, the impingement cooling system 100 may be incorporated into one or more of the turbine shrouds 44A-44C or one or more of the rotor blades 32A-32C. In fact, the impingement cooling system 100 may be incorporated into any suitable component in the gas turbine engine 10.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An impingement cooling system for a gas turbine engine, comprising:
   a gas turbine engine component; and
   an insert positioned within the gas turbine engine component, the insert comprising:
      an insert body comprising an inner surface and an outer surface, the insert body defining an inner cavity therein, a first impingement aperture, a first heat exchanger inlet aperture, and a first heat exchanger outlet aperture;
      a first baffle extending outwardly from the outer surface of the insert body, wherein the first baffle, the gas turbine engine component, and the insert body collectively define a first cooling chamber and a second cooling chamber therebetween, and wherein the first impingement aperture fluidly couples the inner cavity of the insert body and the first cooling chamber; and
      a first heat exchanger wall coupled to the inner surface of the insert body, the first heat exchanger wall and the insert body collectively defining a first heat exchanger chamber therebetween, wherein the first heat exchanger inlet aperture fluidly couples the first cooling chamber and the first heat exchanger chamber, and wherein the first heat exchanger outlet aperture fluidly couples the first heat exchanger chamber and the second cooling chamber.

2. The system of claim 1, wherein the gas turbine engine component and the first baffle define a slot therebetween, and wherein the slot fluidly couples the first cooling chamber and the second cooling chamber.

3. The system of claim 1, wherein the first baffle abuts an inner surface of the gas turbine engine component.

4. The system of claim 1, wherein the first heat exchanger wall comprises an inner surface and an outer surface, and wherein a fin extends outwardly from the outer surface of the first heat exchanger wall into the first heat exchanger chamber.

5. The system of claim 1, wherein the first baffle is positioned circumferentially between the first heat exchanger inlet aperture and the first heat exchanger outlet aperture.

6. The system of claim 1, wherein the first heat exchanger inlet aperture is positioned circumferentially between the first impingement aperture and the first heat exchanger outlet aperture.

7. The system of claim 1, wherein the insert body defines a second impingement aperture, and wherein the second impingement aperture fluidly couples the inner cavity of the insert body and the second cooling chamber.

8. The system of claim 7, wherein the insert body defines a second heat exchanger inlet aperture and a second heat exchanger outlet aperture.

9. The system of claim 8, wherein the insert comprises:
a second baffle extending outwardly from the outer surface of the insert body, wherein the second baffle, the gas turbine engine component, and the insert body collectively define a third cooling chamber therebetween; and
a second heat exchanger wall coupled to the inner surface of the insert body, the second heat exchanger wall and the insert body collectively defining a second heat exchanger chamber therebetween, wherein the second heat exchanger inlet aperture fluidly couples the second cooling chamber and the second heat exchanger chamber, and wherein the second heat exchanger outlet aperture fluidly couples the second heat exchanger chamber and the third cooling chamber.

10. The system of claim 9, wherein the second impingement aperture is positioned circumferentially between the first heat exchanger wall and the second heat exchanger wall.

11. The system of claim 1, wherein the first impingement aperture directs cooling air onto the inner surface of the gas turbine engine component.

12. The system of claim 1, wherein cooling air flows from the first cooling chamber through the first heat exchanger chamber into the second cooling chamber.

13. The system of claim 1, wherein the gas turbine engine component is a turbine nozzle or a turbine shroud.

14. A gas turbine engine, comprising:
a compressor section;
a combustion section;
a turbine section; and
a gas turbine component; and
an insert positioned within the gas turbine engine component, the insert comprising:
an insert body comprising an inner surface and an outer surface, the insert body defining an inner cavity therein, a first impingement aperture, a first heat exchanger inlet aperture, and a first heat exchanger outlet aperture;
a first baffle extending outwardly from the outer surface of the insert body, wherein the first baffle, the gas turbine engine component, and the insert body collectively define a first cooling chamber and a second cooling chamber therebetween, and wherein the first impingement aperture fluidly couples the inner cavity of the insert body and the first cooling chamber; and
a first heat exchanger wall coupled to the inner surface of the insert body, the first heat exchanger wall and the insert body collectively defining a first heat exchanger chamber therebetween, wherein the first heat exchanger inlet aperture fluidly couples the first cooling chamber and the first heat exchanger chamber, and wherein the first heat exchanger outlet aperture fluidly couples the first heat exchanger chamber and the second cooling chamber.

15. The gas turbine engine of claim 14, wherein the gas turbine engine component and the first baffle define a slot therebetween, and wherein the slot fluidly couples the first cooling chamber and the second cooling chamber.

16. The gas turbine engine of claim 14, wherein the first heat exchanger wall comprises an inner surface and an outer surface, and wherein a fin extends outwardly from the outer surface of the first heat exchanger wall into the first heat exchanger chamber.

17. The gas turbine engine of claim 14, wherein the insert body defines a second impingement aperture, and wherein the second impingement aperture fluidly couples the inner cavity of the insert body and the second cooling chamber.

18. The gas turbine engine of claim 17, wherein the insert body defines a second heat exchanger inlet aperture and a second heat exchanger outlet aperture.

19. The gas turbine engine of claim 18, wherein the insert comprises:
a second baffle extending outwardly from the outer surface of the insert body, wherein the second baffle, the gas turbine engine component, and the insert body collectively define a third cooling chamber therebetween; and
a second heat exchanger wall coupled to the inner surface of the insert body, the second heat exchanger wall and the insert body collectively defining a second heat exchanger chamber therebetween, wherein the second heat exchanger inlet aperture fluidly couples the second cooling chamber and the second heat exchanger chamber, and wherein the second heat exchanger outlet aperture fluidly couples the second heat exchanger chamber and the third cooling chamber.

20. The gas turbine engine of claim 14, wherein the gas turbine engine component is a turbine nozzle or a turbine shroud.

* * * * *